US012184337B2

(12) United States Patent
Yamamoto et al.

(10) Patent No.: US 12,184,337 B2
(45) Date of Patent: Dec. 31, 2024

(54) OPTICAL TRANSMISSION SYSTEM, CONTROL APPARATUS, OPTICAL TRANSMISSION METHOD AND PROGRAM

(71) Applicant: NIPPON TELEGRAPH AND TELEPHONE CORPORATION, Tokyo (JP)

(72) Inventors: Shuto Yamamoto, Musashino (JP); Masanori Nakamura, Musashino (JP); Hiroki Taniguchi, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 89 days.

(21) Appl. No.: 18/012,051

(22) PCT Filed: Jul. 30, 2020

(86) PCT No.: PCT/JP2020/029193
§ 371 (c)(1),
(2) Date: Dec. 21, 2022

(87) PCT Pub. No.: WO2022/024288
PCT Pub. Date: Feb. 3, 2022

(65) Prior Publication Data
US 2023/0291482 A1    Sep. 14, 2023

(51) Int. Cl.
*H04B 10/58* (2013.01)
*H04B 10/2513* (2013.01)

(52) U.S. Cl.
CPC ......... *H04B 10/58* (2013.01); *H04B 10/2513* (2013.01)

(58) Field of Classification Search
CPC .......................... H04B 10/58; H04B 10/2513
(Continued)

(56) References Cited

U.S. PATENT DOCUMENTS

2010/0150550 A1* 6/2010 Hashimoto ......... H04J 14/0221
398/79
2013/0271084 A1* 10/2013 Kitanaka ................ B60L 50/40
320/167

FOREIGN PATENT DOCUMENTS

CN     213152035 U  *  5/2021  .......... H03K 19/003
JP        5748342 B2  *  7/2015

OTHER PUBLICATIONS

Sorokina et al; Ripple distribution for nonlinear fiber-optic channels; Feb. 2017; Optics Express; pp. 1-11. (Year: 2017).*
(Continued)

*Primary Examiner* — Amritbir K Sandhu

(57) ABSTRACT

An optical transmission system is an optical transmission system for transmitting a signal from an optical transmitter to an optical receiver via at least a transmission line among one or more optical nodes and the transmission line, wherein the optical transmitter includes a digital filter that compensates for, between ripple components that are micro-fluctuating components in a frequency region representing a transmission characteristic of the signal in the optical transmitter and the optical receiver and non-ripple components of the transmission characteristic, at least the ripple components of the transmission characteristic, and at least one of the optical node and the optical transmitter includes an optical filter that compensates for the non-ripple components of the transmission characteristic.

9 Claims, 11 Drawing Sheets

(58) Field of Classification Search
USPC .......................................................... 398/147
See application file for complete search history.

(56) References Cited

OTHER PUBLICATIONS

Y. Fan et al., "Overall Frequency Response Measurement of DSP-based Optical Transmitter Using Built-in Monitor Photodiode", ECOC 2016, Th2.P2.SC4 (2016).

\* cited by examiner

OPTICAL TRANSMISSION SYSTEM, CONTROL APPARATUS, OPTICAL TRANSMISSION METHOD AND PROGRAM

CROSS-REFERENCE TO RELATED APPLICATIONS

This application is a 371 U.S. National Phase of International Application No. PCT/JP2020/029193, filed on Jul. 30, 2020. The entire disclosure of the above application is incorporated herein by reference.

TECHNICAL FIELD

The present invention relates to an optical transmission system, a control device, an optical transmission method, and a program.

BACKGROUND ART

In an optical transmission system, distortion (deterioration) that occurs in signal waveforms in an optical transmitter, a transmission line and an optical receiver may be compensated for with digital signal processing. Accordingly, signals can be transmitted at 100 Gb/s or higher. In addition, the number of optical nodes provided in a long-distance transmission line can be reduced. Furthermore, transmission capacity can be increased by applying high multi-value modulation, such as quadrature phase shift keying (QPSK), 16 quadrature amplitude modulation (16QAM), or 64 quadrature amplitude modulation (64QAM), to signals.

The performance of transmission is affected by transmission characteristics of signals in an optical transmitter and an optical receiver. Therefore, an optical transmitter and an optical receiver are required to have satisfactory transmission characteristics over a wide band in accordance with increases in transmission capacity and multi-value modulation. However, it is generally difficult to realize satisfactory transmission characteristics over a wide band. Therefore, signal waveforms that have deteriorated due to transmission characteristics of signals in an optical transmitter and an optical receiver are compensated for through digital signal processing of the transmitter/receiver (refer to NPD1).

Transmission characteristics of signals in an optical transmitter and an optical receiver are represented using a transfer function. Deteriorated signal waveforms are compensated for by applying a reverse characteristic of a transmission characteristic to transmission characteristics of signals through a compensation circuit of the transmitter/receiver.

CITATION LIST

Non Patent Document

[NPD 1] Y. Fan, et al., "Overall frequency response measurement of DSP-based optical transmitter using built-in monitor photodiode," Proceeding of ECOC 2016, Th2.P2.SC4 (2016).

Summary of Invention

Technical Problem

Since an optical transmitter has a low-pass transmission characteristic, a digital signal processing circuit of the optical transmitter emphasizes a high frequency region of a signal in advance in order to compensate for a deteriorated signal waveform. Accordingly, transmission characteristics of the signal in the optical transmitter become flat transmission characteristics from a low frequency region to the high frequency region. Further, a digital signal processing circuit of an optical receiver compensates for a deteriorated signal waveform in accordance with transmission characteristics of the signal in a transmission line and the optical receiver.

However, when the digital signal processing circuit of the optical transmitter has emphasized the high frequency region of the signal, rising of the signal waveform becomes steep and the overshoot of the signal waveform increases. Accordingly, there were problems that a peak-to-average power ratio (PAPR) of the signal waveform increased, and the influence of signal waveform deterioration caused by electronic noise and an electronic nonlinear response in the optical transmitter and signal waveform deterioration caused by optical noise in the optical transmitter and optical nodes became significant.

In view of the above circumstances, an object of the present invention is to provide an optical transmission system, a control device, an optical transmission method, and a program capable of reducing deterioration of signal waveforms.

Solution to Problem

One aspect of the present invention is an optical transmission system for transmitting a signal from an optical transmitter to an optical receiver via at least a transmission line among one or more optical nodes and the transmission line, wherein the optical transmitter includes a digital filter that compensates for, between ripple components that are micro-fluctuating components in a frequency region representing a transmission characteristic of the signal in the optical transmitter and the optical receiver and non-ripple components of the transmission characteristic, at least the ripple components of the transmission characteristic, and at least one of the optical node and the optical transmitter includes an optical filter that compensates for the non-ripple components of the transmission characteristic.

One aspect of the present invention is a control device of an optical transmission system for transmitting a signal from an optical transmitter to an optical receiver via at least a transmission line among one or more optical nodes and the transmission line, the control device executing convolution processing or averaging processing on a reverse characteristic of a transmission characteristic of the signal in the optical transmitter and the optical receiver to derive non-ripple components of the reverse characteristic, controlling an operation of an optical filter that compensates for non-ripple components of the transmission characteristic on the basis of the non-ripple components of the reverse characteristic, deriving ripple components of the reverse characteristic by removing the derived non-ripple components of the reverse characteristic from the reverse characteristic, and controlling an operation of a digital filter that compensates for the ripple components of the transmission characteristic on the basis of the ripple components of the reverse characteristic.

One aspect of the present invention is an optical transmission method executed by an optical transmission system for transmitting a signal from an optical transmitter to an optical receiver via at least a transmission line among one or more optical nodes and the transmission line, including: compensating for, by the optical transmitter, between ripple components that are micro-fluctuating components in a frequency region representing a transmission characteristic of the signal in the optical transmitter and the optical receiver and non-ripple components of the transmission characteristic, at least the ripple components of the transmission characteristic, using a digital filter; and compensating for, by at least one of the optical node and the optical transmitter, the non-ripple components of the transmission characteristic using an optical filter.

One aspect of the present invention is a program for causing a computer to serve as the aforementioned optical transmission system.

Advantageous Effects of Invention

According to the present invention, it is possible to reduce deterioration of signal waveforms.

DESCRIPTION OF EMBODIMENTS

Embodiments of the present invention will be described in detail with reference to the drawings.

First Embodiment

Figure 1:
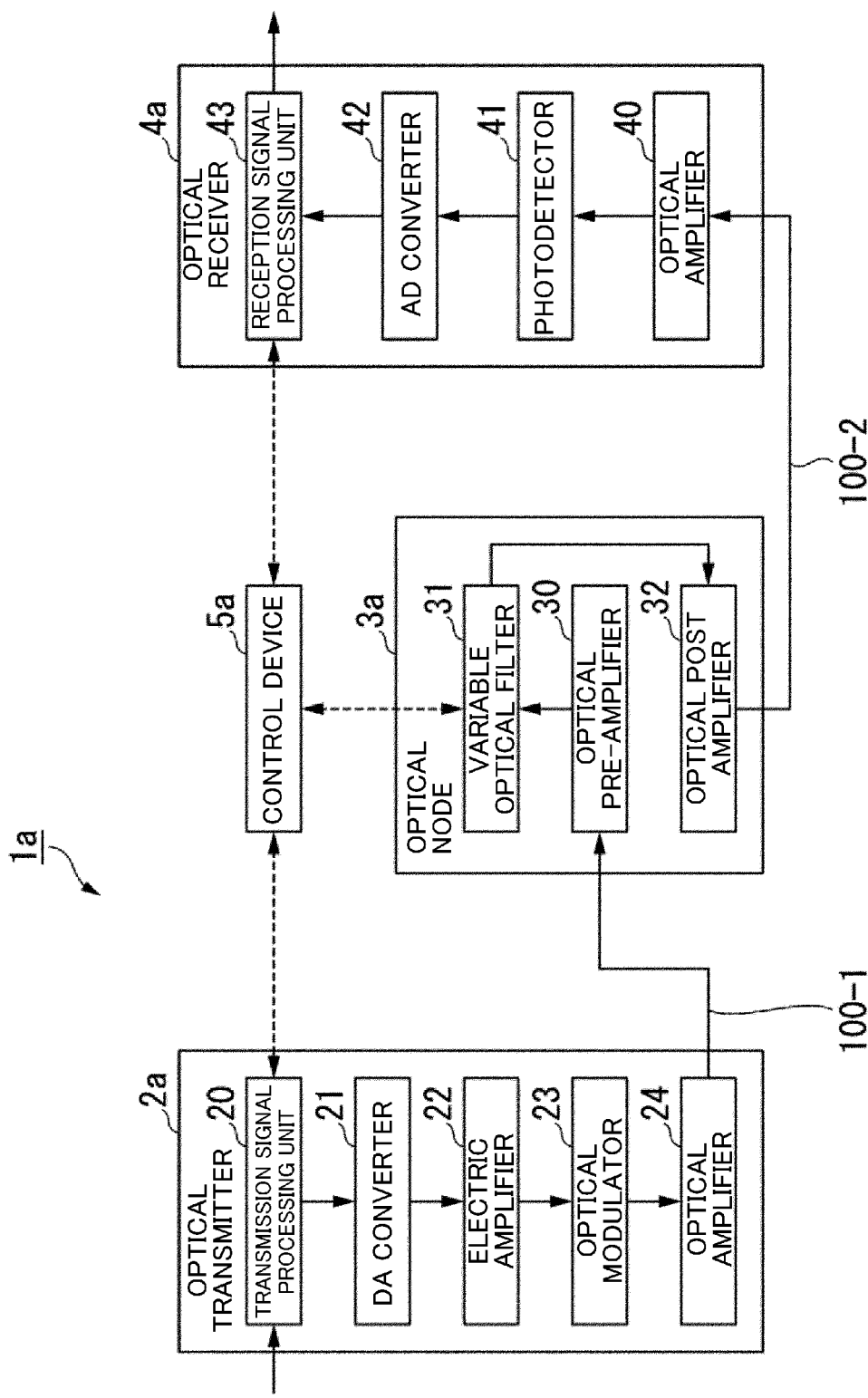
FIG. 1 is a diagram showing an example of a configuration of an optical transmission system according to a first embodiment.

FIG. 1 is a diagram showing an example of a configuration of an optical transmission system 1a in a first embodiment. The optical transmission system 1a is a system for transmitting a signal using light. The optical transmission system 1a includes an optical transmitter 2a, a transmission line 100, an optical node 3a, an optical receiver 4a, and a control device 5a (control apparatus).

The optical transmitter 2a includes a transmission signal processing unit 20, a DA converter 21 (digital-to-analogue converter), an electric amplifier 22, an optical modulator 23, and an optical amplifier 24.

The optical node 3a includes a variable optical filter 31. The optical node 3a may further include an optical preamplifier 30 and an optical post amplifier 32.

The optical receiver 4a includes an optical amplifier 40, a photodetector 41, an AD converter 42 (analog-to-digital converter), and a reception signal processing unit 43. For a signal for intensity modulation such as pulse amplitude modulation (PAM), for example, a direct detector is used as the photodetector 41. For a signal for complex amplitude modulation such as quadrature amplitude modulation (QAM), for example, a coherent detector is used as the photodetector 41.

Next, the optical transmitter 2a will be described.

The transmission signal processing unit 20 is a functional unit that executes digital signal processing according to control of the control device 5a. The transmission signal processing unit 20 generates an electrical signal that is (digital) transmission data. The DA converter 21 converts the electrical signal that is the transmission data into an analog electrical signal. The electric amplifier 22 amplifies the power of the analog electrical signal. The optical modulator 23 generates a wavelength-multiplexed optical signal by performing optical modulation processing on the analogue electrical signal. The optical amplifier 24 amplifies the power of the wavelength-multiplexed optical signal. The optical amplifier 24 transmits the wavelength-multiplexed optical signal to the optical node 3a via a transmission line 100-1 having an optical fiber.

Next, the optical node 3a will be described.

The optical preamplifier 30 receives a wavelength-multiplexed optical signal. The optical preamplifier 30 amplifies the power (amplitude) of the wavelength-multiplexed optical signal. The optical preamplifier 30 may adjust the level of the wavelength-multiplexed optical signal.

The variable optical filter 31 compensates for signal waveform deterioration caused by signal transmission characteristics in the optical transmitter 2a and the optical receiver 4a using an optical filter. A permeation characteristic (set value of the optical filter) of an optical signal in the optical filter of the variable optical filter 31 is set by a control device 5a.

The optical post amplifier 32 amplifies the power of the wavelength-multiplexed optical signal. The optical post amplifier 32 transmits the wavelength-multiplexed optical signal to the optical receiver 4a via a transmission line 100-2 having an optical fiber or the like. The optical node 3a may switch a path (wavelength channel) of the optical signal for each wavelength of the wavelength-multiplexed optical signal.

Next, the optical receiver 4a will be described.

The optical amplifier 40 receives the wavelength-multiplexed optical signal from the optical post amplifier 32. The optical amplifier 40 amplifies the power of the wavelength-multiplexed optical signal. The optical amplifier 40 outputs the wavelength-multiplexed optical signal to the photodetector 41. The photodetector 41 performs detection processing on the wavelength-multiplexed optical signal. The photodetector 41 outputs the detected signal (analog electrical signal) to the AD converter 42.

The AD converter 42 (analog-to-digital converter) converts the detected signal into a digital electrical signal. The AD converter 42 outputs the digital electrical signal to the reception signal processing unit 43. The reception signal processing unit 43 is a functional unit that executes digital signal processing according to control of the control device 5a. The reception signal processing unit 43 generates (digital) reception data. The reception signal processing unit 43 transmits the reception data to a predetermined external device (not shown).

Next, processing for compensating for a deteriorated signal waveform (signal quality) will be described.

In the following description, a transmission characteristic "H(f)" of signals in the optical transmitter 2a and the optical receiver 4a is known. Here, "f" represents the frequency of a signal.

A reverse characteristic "G(f)" of the transmission characteristic "H(f)" is used to compensate for a deteriorated signal waveform. The reverse characteristic "G(f)" is represented by formula (1).

[Math. 1]
$$G(f) = \begin{cases} 1/H(f) & f \leq f_B/2 \\ 0 & f > f_B/2 \end{cases} \quad (1)$$

Here, "$f_B$" represents a modulation frequency (baud rate) of a signal.

Figure 2:
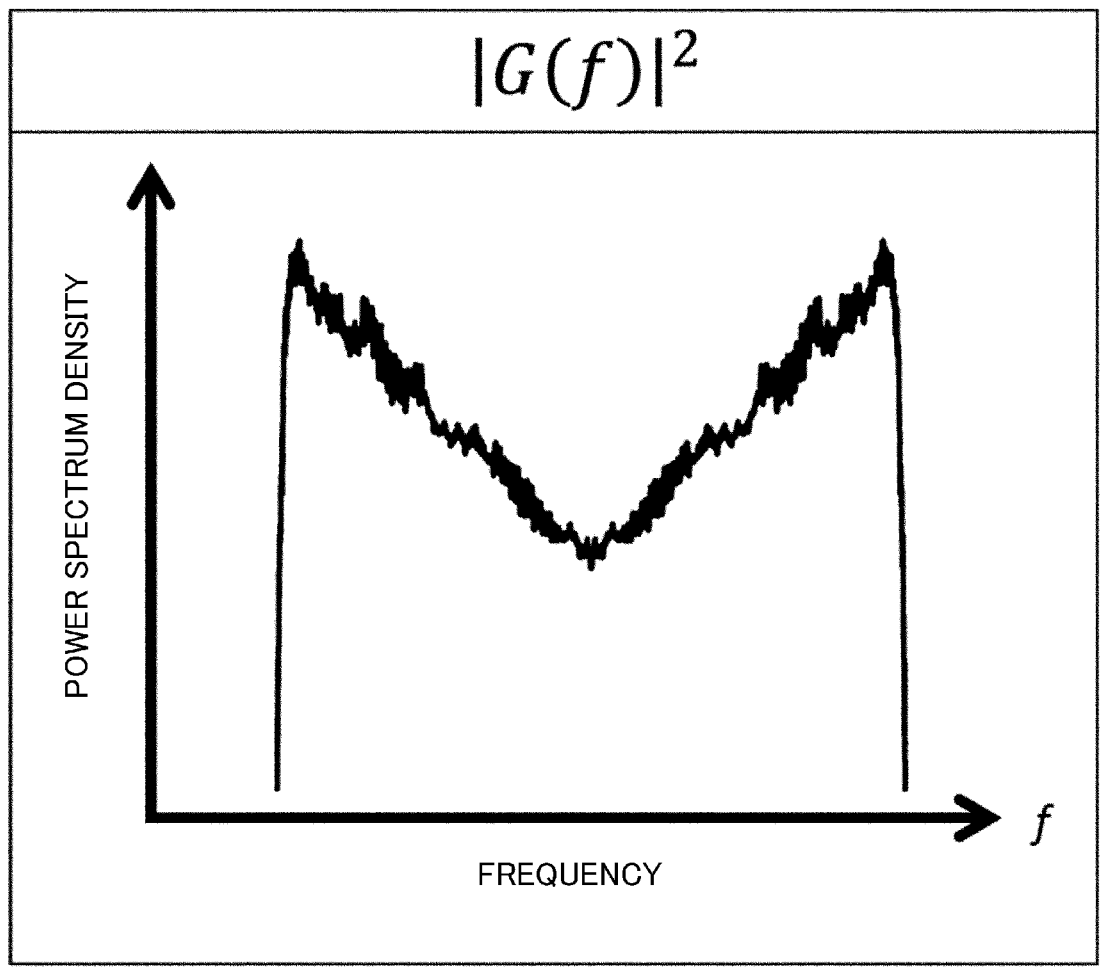
FIG. 2 is a diagram showing an example of reverse characteristics of signal transmission characteristics in an optical transmitter and an optical receiver in the first embodiment.

FIG. 2 is a diagram showing an example of the reverse characteristic "G(f)" of the transmission characteristic of signals in the optical transmitter 2a and the optical receiver 4a. Here, "|G(f)|²" represents the intensity (power spectrum) of the reverse characteristic "G(f)." The reverse characteristic "G(f)" is composed of fine structure components (hereinafter referred to as "ripple components") "J(f)" caused by signal reflection occurring inside the optical transmitter 2a and inside the optical receiver 4a and non-fine structure components (hereinafter referred to as "non-ripple components") "K(f)" caused by a low-pass type transmission characteristic. That is, the reverse characteristic "G(f)" is represented as "G(f)=J(f)×K(f)."

The control device 5a derives ripple components "J(f)" of the reverse characteristic "G(f)" and non-ripple components "K(f)" of the reverse characteristic "G(f)." The control device 5a derives a setting value of a digital filter (shape information of the digital filter) of the transmission signal processing unit 20 such that the transmission signal processing unit 20 provides the ripple components "J(f)" to the digital electrical signal. The control device 5a transmits the setting value of the digital filter to the transmission signal processing unit 20.

The control device 5a derives a setting value of the optical filter of the variable optical filter 31 such that the transmission signal processing unit 20 provides the non-ripple components "K(f)" to transmission characteristics of signals. The control device 5a outputs the setting value of the optical filter to the variable optical filter 31. Accordingly, it is possible to compensate for signal waveform deterioration caused by transmission characteristics of signals in the optical transmitter 2a and the optical receiver 4a.

Since the setting value of the digital filter for compensating for ripple components is set in the digital filter of the transmission signal processing unit 20 in this manner, an electrical signal in which a high frequency component has not been emphasized is input to the electric amplifier 22.

Further, since the setting value of the optical filter for compensating for non-ripple components is set in the optical filter of the variable optical filter 31, an optical signal in which a high frequency component has not been emphasized is input to the optical post amplifier 32.

Accordingly, the peak-to-average power ratio (PAPR) of the electrical signal does not easily increase. Similarly, the peak-to-average power ratio of the optical signal does not easily increase. Therefore, the influence of signal waveform deterioration caused by electrical noise applied to an analog electrical signal by the electric amplifier 22 and optical noise applied to an optical signal by the optical post amplifier 32 (optical amplifier) is reduced.

Next, an operation example of the optical transmission system 1a will be described.

Figure 3:
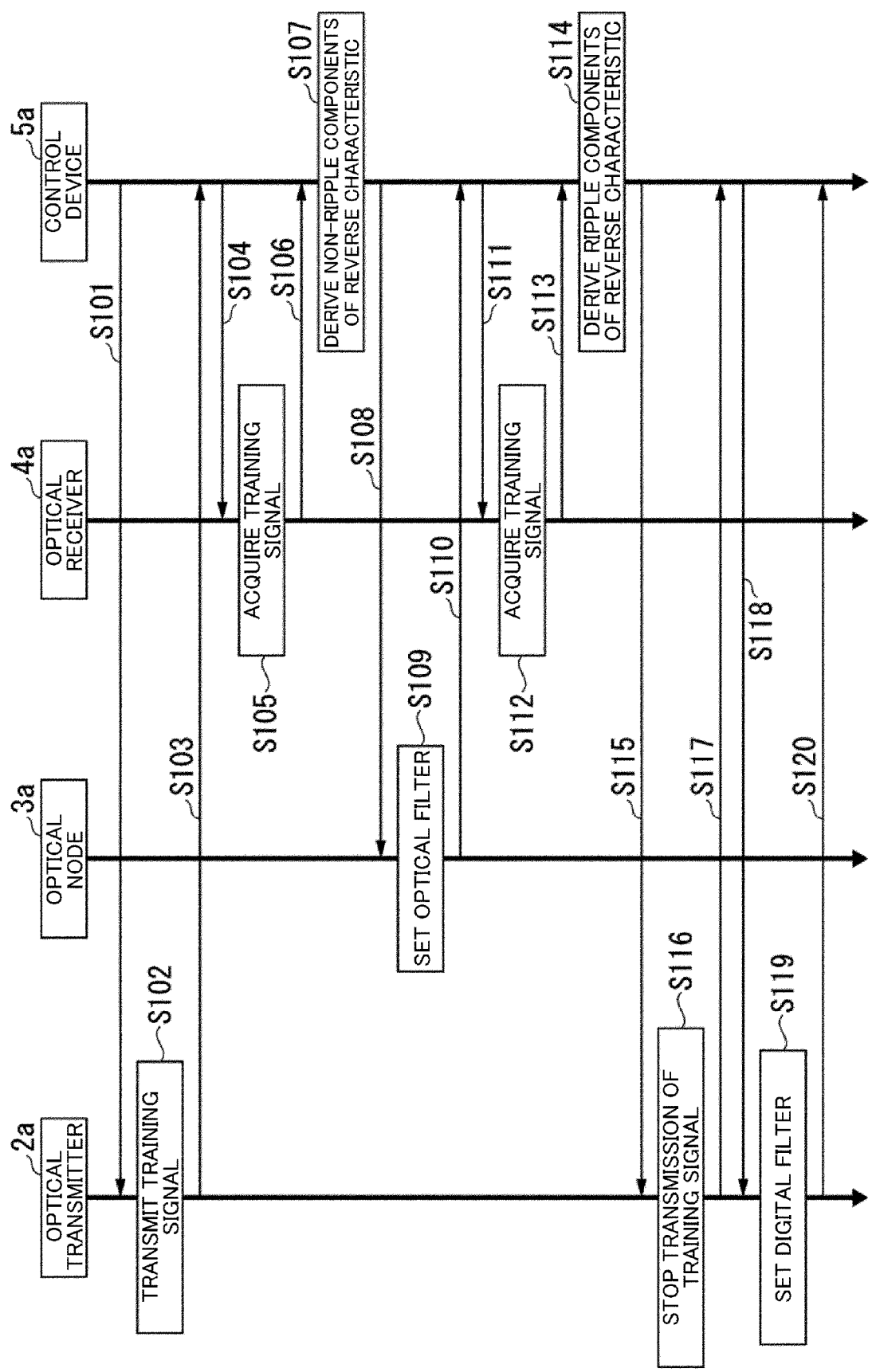
FIG. 3 is a sequence diagram showing an operation example of the optical transmission system in the first embodiment.

FIG. 3 is a sequence diagram showing an operation example of the optical transmission system 1a according to the first embodiment. The control device 5a transmits a training signal transmission instruction to the optical transmitter 2a (S101). The optical transmitter 2a transmits a predetermined training signal to the optical node 3a on the basis of the training signal transmission instruction (S102). The optical transmitter 2a notifies the control device 5a that transmission of the training signal is started (step S103).

The control device 5a transmits an instruction (capture instruction) for acquiring the training signal (reception signal) to the optical receiver 4a (step S104). The optical receiver 4a acquires the training signal on the basis of the instruction for acquiring the training signal (step S105). The optical receiver 4a transmits information of the training signal to the control device 5a (step S106).

The control device 5a derives a transmission characteristic of the training signal in the optical transmitter 2a and the optical receiver 4a on the basis of the information of the training signal. The control device 5a derives a reverse characteristic "G(f)" of the transmission characteristic of the training signal. The control device 5a derives non-ripple components "K(f)" of the reverse characteristic "G(f)." The control device 5a may derive the intensity "|K(f)|²" of the non-ripple components of reverse characteristic "G(f)" (step S107).

The control device 5a derives a setting value of the optical filter on the basis of either of the non-ripple components "K(f)" and the intensity "|K(f)|²" of the non-ripple components. The control device 5a transmits the setting value of the optical filter to the optical node 3a (step S108).

The optical node 3a sets the setting value of the optical filter to the optical filter of the variable optical filter 31 (step S109). The optical node 3a notifies the control device 5a that setting of the optical filter is completed (step S110).

The control device 5a transmits an instruction (capture instruction) for acquiring the training signal (reception signal) to the optical receiver 4a (step S111). The optical receiver 4a acquires the training signal on the basis of the instruction for acquiring the training signal (step S112). The optical receiver 4a transmits information of the training signal to the control device 5a (step S113).

The control device 5a derives ripple components "J(f)" of the reverse characteristic "G(f)." The control device 5a may derive the intensity "|J(f)|²" of the ripple components of the reverse characteristic "G(f)" (step S114). The control device 5a transmits an instruction for stopping transmission of the training signal to the optical transmitter 2a (step S115).

The optical transmitter 2a stops transmission of the training signal on the basis of the instruction for stopping transmission of the training signal (step S116). The optical transmitter 2a notifies the control device 5a that transmission of the training signal is stopped (step S117). The control device 5a transmits a setting value of the digital filter based on the value of the ripple components "J(f)" (shape information of the digital filter) to the transmission signal processing unit 20 such that the transmission signal processing unit 20 provides the ripple components "J(f)" to transmission characteristics of the digital electrical signal (step S118).

The optical transmitter 2a sets the setting value of the digital filter to the digital filter of the transmission signal processing unit 20 (step S119). The optical transmitter 2a notifies the control device 5a that digital filter setting is completed (step S120).

Accordingly, setting of the optical filter for compensating for ripple components and setting of the digital filter for compensating for non-ripple components are completed.

Next, transmission characteristic evaluation results will be described.

Figure 4:
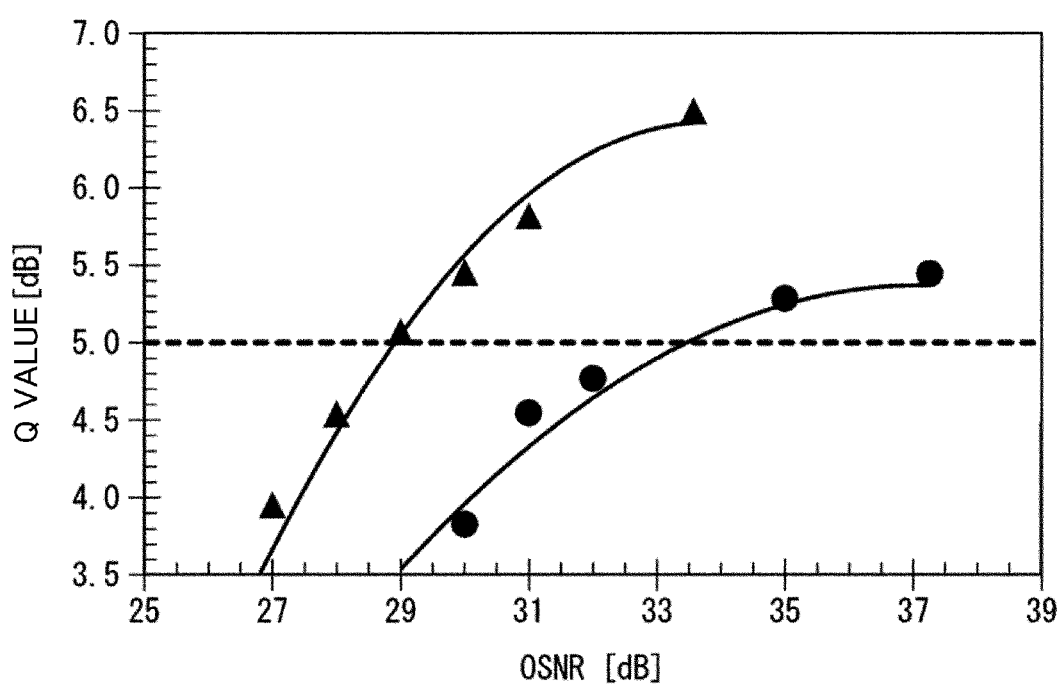
FIG. 4 is a diagram showing an example of evaluation results of transmission performance in the first embodiment.

FIG. 4 is a diagram showing an example of transmission characteristic evaluation results in the first embodiment. The horizontal axis represents an optical signal-to-noise ratio (OSNR). The vertical axis represents a Q value depending on a signal waveform.

Triangles shown in FIG. 4 represent Q values (actual measurement values) with respect to optical signal-to-noise ratios when the transmission signal processing unit 20 compensates for ripple components of transmission characteristics and the variable optical filter 31 compensates for non-ripple components of the transmission characteristics for a 64QAM signal polarization-multiplexed at 92 GBd.

Circles shown in FIG. 4 as a comparison object represent Q values (actual measurement values) with respect to optical signal-to-noise ratios when the transmission signal processing unit 20 compensates for the ripple components and the non-ripple components of the transmission characteristics for the 64QAM signal polarization-multiplexed at 92 GBd.

As shown in FIG. 4, it is possible to compensate for signal waveform deterioration more efficiently in the case where the transmission signal processing unit 20 compensates for the ripple components of the transmission characteristics and the variable optical filter 31 compensates for the non-ripple components of the transmission characteristics rather than the case where the transmission signal processing unit 20 compensates for the ripple components and the non-ripple components of the transmission characteristics.

As described above, the optical transmitter 2a includes the transmission signal processing unit 20 having the digital filter. The digital filter compensates for at least the ripple components of the transmission characteristics between the ripple components which are micro-fluctuating components of a frequency region representing the transmission characteristics of signals in the optical transmitter 2a and the optical receiver 4a and non-ripple components of the transmission characteristics. The optical node 3a has the optical filter. The optical filter compensates for the non-ripple components of the transmission characteristics. Accordingly, it is possible to reduce signal waveform deterioration.

Second Embodiment

The second embodiment differs from the first embodiment in that a plurality of optical nodes share compensation of non-ripple components of the reverse characteristic on the basis of a predetermined sharing rate. In the second embodiment, differences from the first embodiment will be mainly described.

Figure 5:
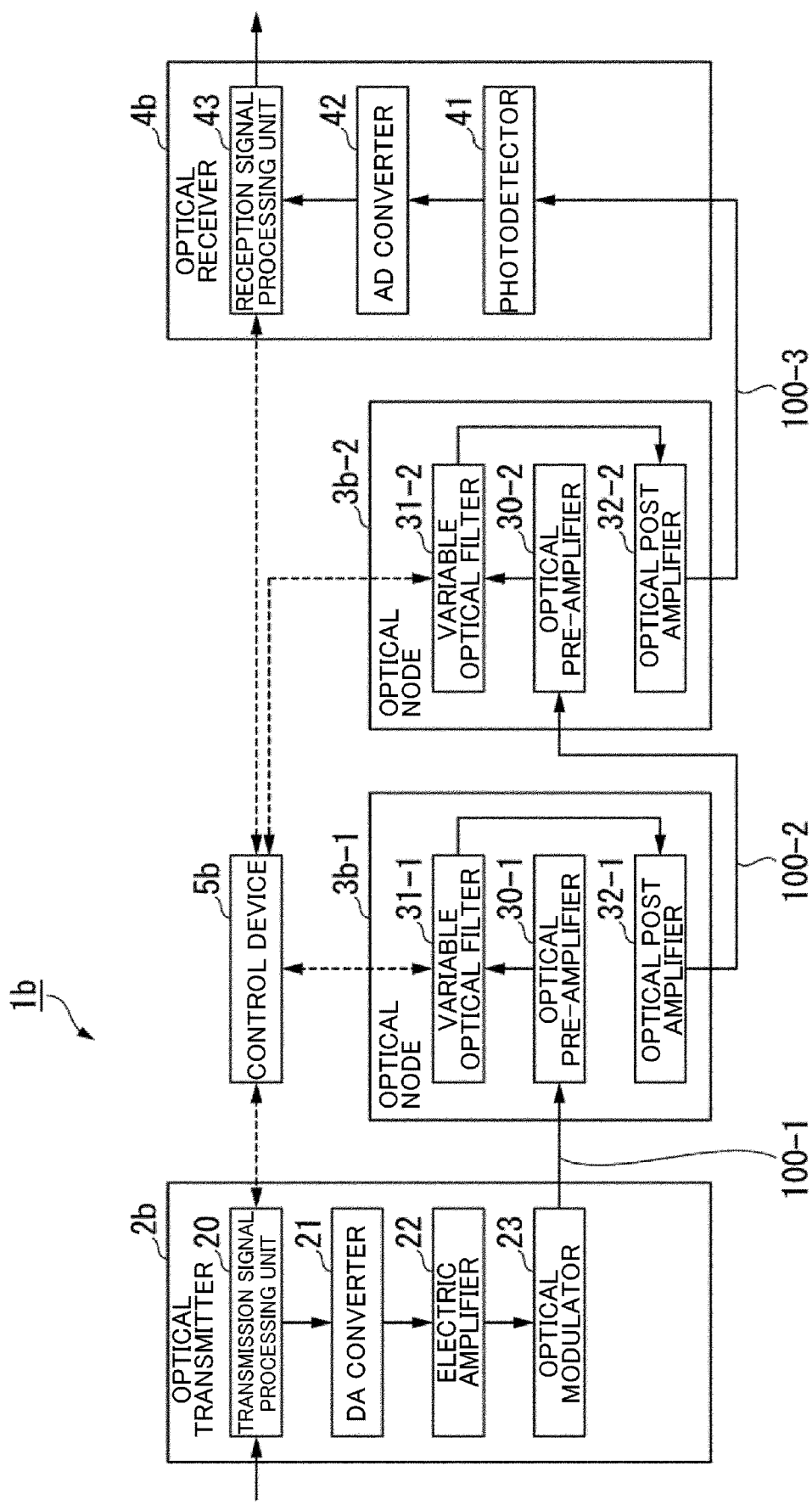
FIG. 5 is a diagram showing an example of a configuration of an optical transmission system in a second embodiment.

FIG. 5 is a diagram showing an example of a configuration of an optical transmission system 1b in the second embodiment. The optical transmission system 1b includes an optical transmitter 2b, a transmission line 100, a plurality of optical nodes 3b, an optical receiver 4b, and a control device 5b (control apparatus). The plurality of optical nodes 3b include, for example, an optical node 3b-1 and an optical node 3b-2.

The optical transmitter 2b includes a transmission signal processing unit 20, a DA converter 21, an electric amplifier 22, and an optical modulator 23.

The optical node 3b includes an optical preamplifier 30, a variable optical filter 31, and an optical post amplifier 32.

The optical receiver 4b includes a photodetector 41, an AD converter 42, and a reception signal processing unit 43.

The optical modulator 23 transmits a wavelength-multiplexed optical signal to an optical preamplifier 30-1 via a transmission line 100-1 having an optical fiber. An optical post amplifier 32-1 transmits the wavelength-multiplexed optical signal to the optical node 3b-2 via a transmission line 100-2 having an optical fiber. An optical post amplifier 32-2 transmits the wavelength-multiplexed optical signal to the optical receiver 4b via a transmission line 100-3 having an optical fiber.

In FIG. 5, it is not necessary to compensate for all non-ripple components using one optical node 3b. A variable optical filter 31-1 of the optical node 3b-1 compensates for some of the non-ripple components of the reverse characteristic at a predetermined sharing rate (for example, 1/2), and a variable optical filter 31-2 of the optical node 3b-2 compensates for non-ripple components remaining uncompensated. The sharing rate is predetermined by the control device 5b, for example, according to predetermined conditions.

At least one of the transmission signal processing unit 20 of the optical transmitter 2b and the reception signal processing unit 43 of the optical receiver 4b may compensate for non-ripple components remaining uncompensated by both the optical node 3b-1 and the optical node 3b-2.

As described above, the plurality of optical nodes 3b compensate for non-ripple components of transmission characteristics in a sharing manner on the basis of a sharing rate of the amount of compensation of non-ripple components of the transmission characteristics derived by, for example, the control device 5b. Accordingly, it is possible to reduce signal waveform deterioration.

Third Embodiment

The third embodiment differs from the second embodiment in that the optical transmitter includes an optical amplifier and the optical receiver includes an optical amplifier. In the third embodiment, differences from the second embodiment will be mainly described.

Figure 6:
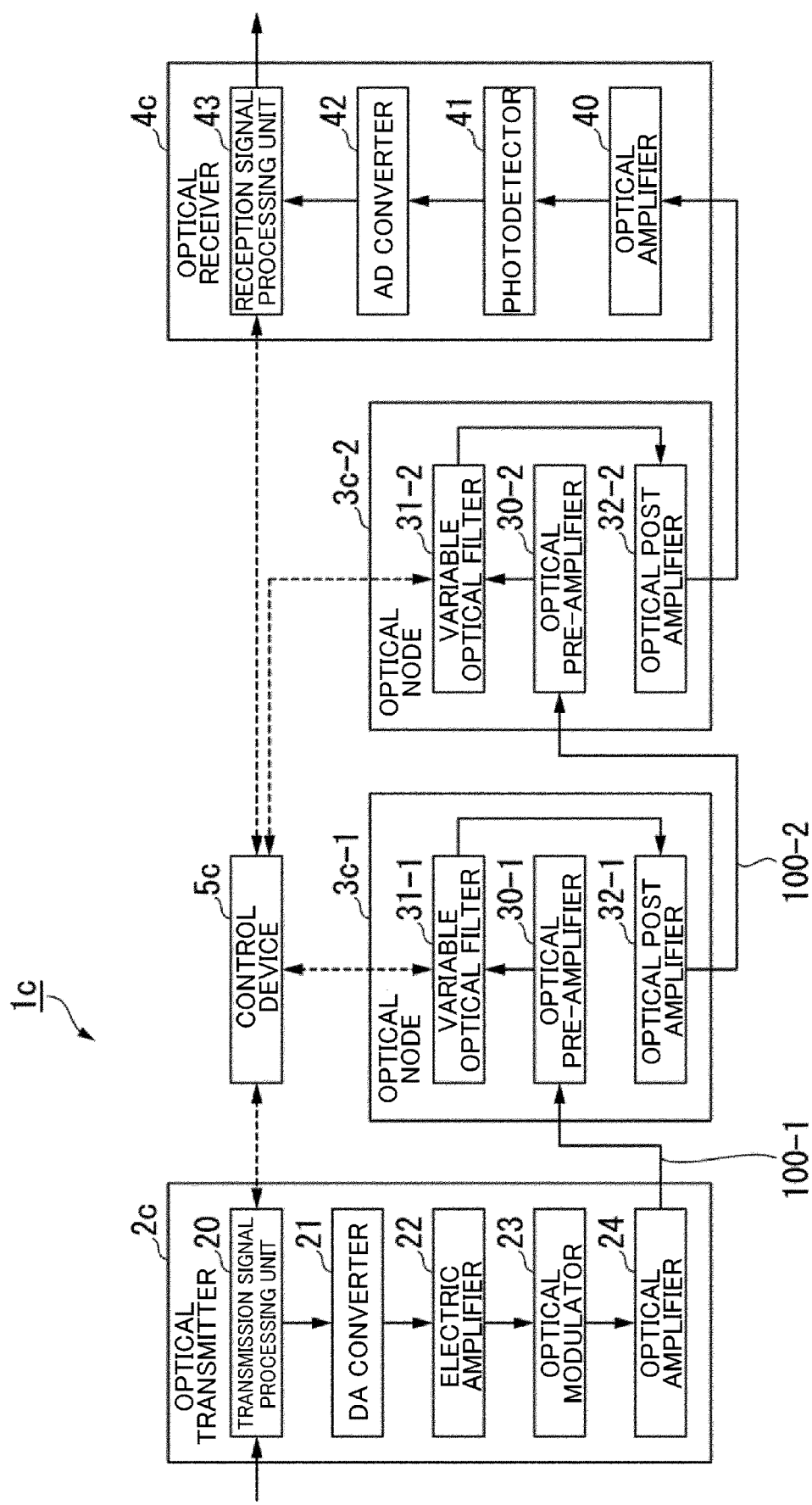
FIG. 6 is a diagram showing an example of a configuration of an optical transmission system in a third embodiment.

FIG. 6 is a diagram showing an example of a configuration of an optical transmission system 1c in the third embodiment. The optical transmission system 1c includes an optical transmitter 2c, a transmission line 100, a plurality of optical nodes 3c, an optical receiver 4c, and a control device 5c (control apparatus). The plurality of optical nodes 3c include, for example, an optical node 3c-1 and an optical node 3c-2.

The optical transmitter 2c includes a transmission signal processing unit 20, a DA converter 21, an electric amplifier 22, an optical modulator 23, and an optical amplifier 24. The optical receiver 4a includes an optical amplifier 40, a photodetector 41, an AD converter 42, and a reception signal processing unit 43.

Figure 7:
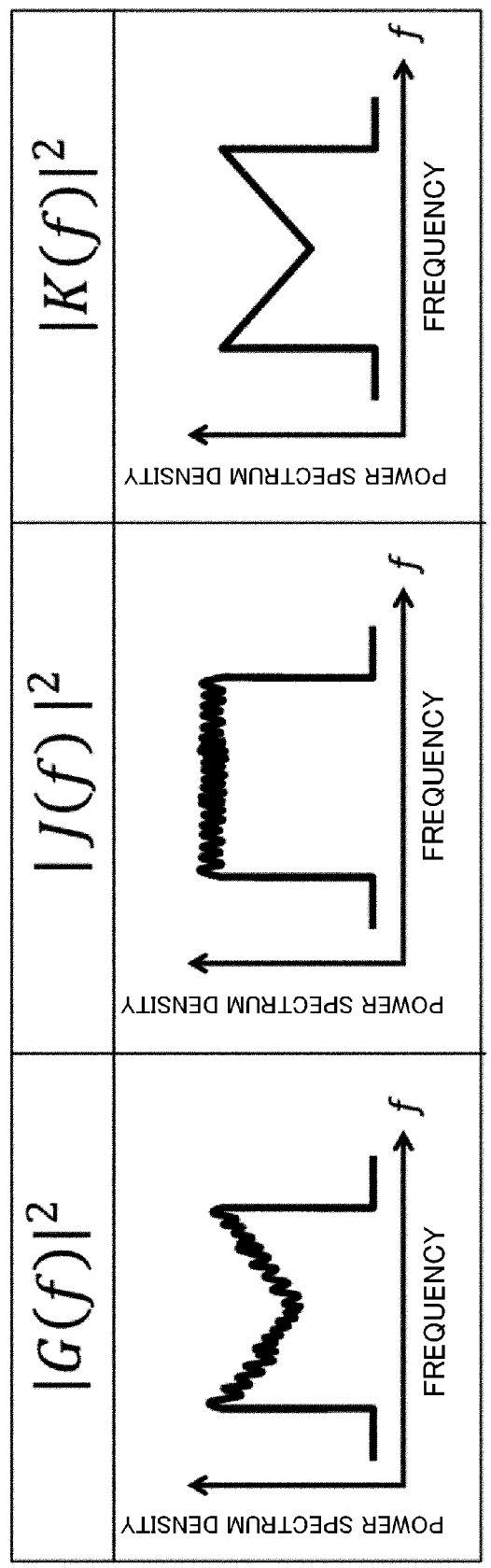
FIG. 7 is a diagram showing the intensity of a reverse characteristic of a transmission characteristic, the intensity of ripple components of the reverse characteristic, and the intensity of non-ripple components of the reverse characteristic in the third embodiment.

FIG. 7 is a diagram showing the intensity "$|G(f)|^2$" of the reverse characteristic of the transmission characteristic, the intensity "$|J(f)|^2$" of ripple components of the reverse characteristic, and the intensity "$|K(f)|^2$" of non-ripple components of the reverse characteristic in the third embodiment.

The variable optical filter 31 of the optical node 3c compensates for non-ripple components of the transmission characteristic by providing loss (non-ripple components of the reverse characteristic) different depending on frequencies to transmission characteristics of optical signals. Therefore, as the amount of compensation by the variable optical filter 31 increases, the power of an optical signal output from the variable optical filter 31 decreases. That is, the power of the output optical signal is more affected by signal waveform deterioration caused by optical noise as the amount of compensation by the variable optical filter 31 increases.

Accordingly, the plurality of optical nodes 3c compensate for non-ripple components of the transmission characteristic in a sharing manner on the basis of a sharing rate of the amount of compensation of non-ripple components of the transmission characteristic derived by the control device 5c. For example, an optical node 3c having a margin in the power of an optical signal output from the variable optical filter 31 may compensate for many parts of the non-ripple components. Further, an optical node 3c having no margin in the power of the optical signal output from the variable optical filter 31 may compensate for non-ripple components remaining without being compensated for by other optical nodes 3c. Accordingly, it is possible to compensate for signal waveform deterioration according to transmission characteristics of signals in the optical transmitter 2c and the optical receiver 4c while minimizing transmission performance deterioration.

Figure 8:
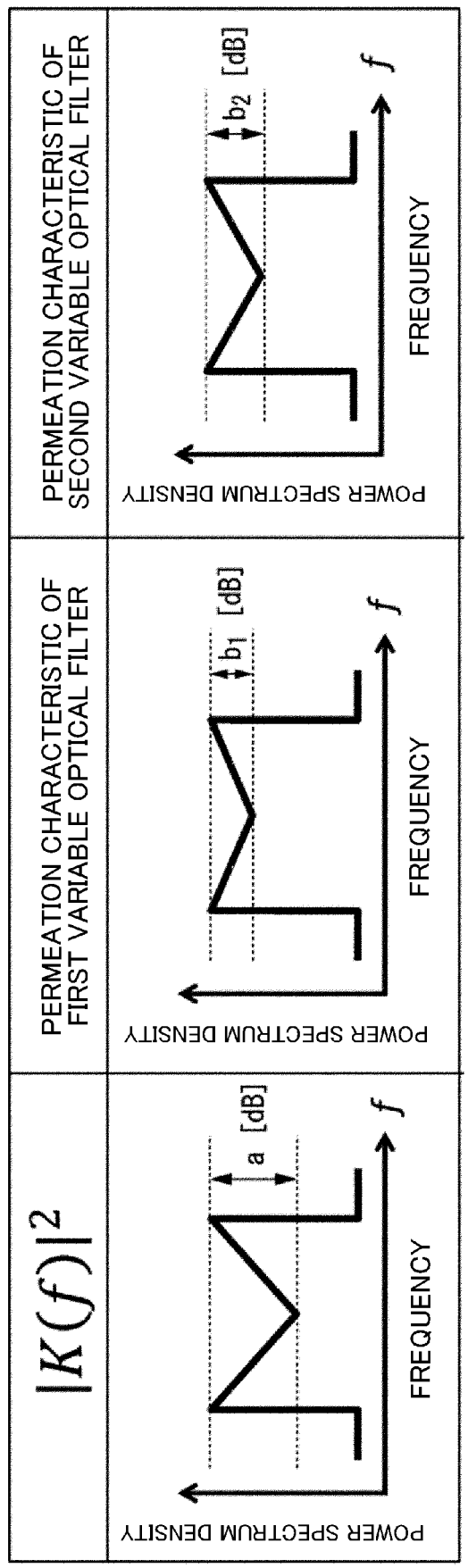
FIG. 8 is a diagram showing the intensity of the non-ripple components of the reverse characteristic, a permeation characteristic of a first variable optical filter, and a permeation characteristic of a second variable optical filter in the third embodiment.

FIG. 8 is a diagram showing the intensity "$|K(f)^2|^2$" of non-ripple components of the reverse characteristic, the permeation characteristic of the first variable optical filter, and the permeation characteristic of the second variable optical filter in the third embodiment. The optical filter of the variable optical filter 31 compensates for non-ripple components of the reverse characteristic. The variable optical filter 31 provides a large loss to components of the center (optical carrier frequency) of a frequency region of an optical signal transmitting through the optical filter of the variable optical filter 31. As the amount of compensation by the variable optical filter 31 increases, a larger loss is provided to the components of the center of the frequency region of the optical signal, and the power of the optical signal output from the variable optical filter 31 decreases.

"a[dB]" shown in FIG. 8 represents a loss of the optical signal according to permeation characteristic corresponding to the intensity "$|K(f)^2|$" of non-ripple components of the reverse characteristic. It is possible to realize the loss "a(dB)" using a loss "b" of the optical signal according to the permeation characteristic of the variable optical filter 31-1 and a loss "$b_2$" of the optical signal according to the permeation characteristic of the variable optical filter 31-2. For example, the control device 5c can set the setting value "b" of the optical filter to the optical filter of the variable optical filter 31-1 and set the setting value "$b_2$" of the optical filter to the optical filter of the variable optical filter 31-2 such that "$a=b_1+b_2$" is satisfied to realize the loss "a(dB)" of the optical signal.

The power of the optical signal transmitted from the optical node 3c-1 when the variable optical filter 31-1 has compensated for deterioration is represented "$c_1-b_1$" [dBm]. The power of the optical signal transmitted from the optical node 3c-2 when the variable optical filter 31-2 has compensated for deterioration is represented "$c_2-b_2$" [dBm]. Here, "C" represents the power [dBm] of the optical signal transmitted from the optical node 3c-1 when the variable optical filter 31-1 has not compensated for deterioration. "$c_2$" represents the power [dBm] of the optical signal transmitted from the optical node 3c-2 when the variable optical filter 31-2 has not compensated for deterioration.

The control device 5c derives loss "$b_1$" and loss "$b_2$" which satisfy "$a=b_1+b_2$" and in which power "$c_1-b_1$" and power "$c_2-b_2$" become equal. Accordingly, it is possible to compensate for signal waveform deterioration according to transmission characteristics of signals in the optical transmitter 2c and the optical receiver 4c while minimizing transmission performance deterioration.

Loss "$b_1$" of the optical signal is represented by formula (2).

[Math. 2]
$$b_1 = \frac{a + c_1 - c_2}{2} \quad (2)$$

Loss "$b_2$" of the optical signal is represented by formula (3).

[Math. 3]
$$b_2 = \frac{a - c_1 + c_2}{2} \quad (3)$$

Loss "$b_i$" of an optical signal transmitted from an optical node 3c-i in N optical nodes 3c is represented by formula (4).

[Math. 4]
$$b_i = c_i + \frac{1}{N}\left(a - \sum_{j=1}^{N} c_j\right) \quad (4)$$

Here, "$c_i$" represents the power of an optical signal output from a variable optical filter 31-i to an optical post amplifier 32-i of the optical node 3c-i.

The control device 5c derives loss "$b_i$" of the optical signal. The permeation characteristic "$L_i(f)$" of the optical filter of the variable optical filter 31-i is represented by formula (5).

[Math. 5]
$$L_i(f) = [K(f)]^{\frac{b_i}{a}} \quad (5)$$

The control device 5c sets a setting value of the optical filter corresponding to the permeation characteristic "$L_i(f)$" to each variable optical filter 31.

As described above, the control device 5c derives a sharing rate for each optical node 3c on the basis of the power of the optical signal output from the variable optical filter 31 (optical filter) of each optical node 3c. Accordingly, it is possible to reduce signal waveform deterioration.

Fourth Embodiment

The fourth embodiment differs from the third embodiment in that the optical transmission system uses each variable optical filter having loss "$b_i$" of an optical signal according to a permeation characteristic, which maximizes the optical signal-to-noise ratio (OSNR) at the time of reception in the optical receiver. In the fourth embodiment, differences from the third embodiment will be mainly described.

The control device 5c outputs a setting value (a sharing rate of the amount of compensation of non-ripple components of transmission characteristics) of an optical filter for providing loss "$b_i$" which maximizes the optical signal-to-noise ratio in the optical receiver 4c to the optical signal to a variable optical filter 31-i. When the optical transmission system 1c includes N optical nodes 3c, the optical signal-to-noise ratio ($OSNR_N$) is represented by formula (6).

[Math. 6]

$$OSNR_N = \left[ \frac{1}{OSNR_{N-1}} + \frac{NF_N hc^2 \Delta \lambda}{10^{\frac{c_N - b_N}{10}}} \right]^{-1} \quad (6)$$

Here, formula (7) is established with respect to "i>0."

[Math. 7]

$$OSNR_i = \left[ \frac{1}{OSNR_{i-1}} + \frac{NF_i hc^2 \Delta \lambda}{10^{\frac{c_i - b_i}{10}}} \right]^{-1} \quad (7)$$

"$OSNR_i$" represents an optical signal-to-noise ratio of a signal transmitted from an optical node 3c-i. "$OSNR_0$" represents an optical signal-to-noise ratio of an optical signal transmitted from the optical transmitter 2c. "$NF_i$" represents a noise index of the optical post amplifier 32. "h" represents the Planck constant. "c" represents the velocity of light. "$\lambda$" represents the carrier wavelength of an optical signal. "$\Delta \lambda$" is 0.1 [nm], for example. "$c_i$" represents the power of an optical signal output from the variable optical filter 31c-i to the optical post amplifier 32-i of the optical node 3c-i. Further, "$b_i$" satisfies formula (8).

[Math. 8]

$$a = \sum_{i=1}^{N} b_i \quad (8)$$

Further, the control device 5c sets the setting value of the optical filter corresponding to "$L_i(f)$" shown in formula (5) to each variable optical filter 31. Accordingly, it is possible to compensate for signal waveform deterioration caused by transmission characteristics of signals in the optical transmitter 2c and the optical receiver 4c.

As described above, the control device 5c derives a sharing rate such that the optical signal-to-noise ratio at the time of reception in the optical receiver 4c is maximized. Accordingly, it is possible to reduce signal waveform deterioration. Although complicated operations and information such as the noise index of the optical post amplifier 32 are required, signal waveform deterioration is less than that in the third embodiment.

Fifth Embodiment

The fifth embodiment differs from the first embodiment to the fourth embodiment in that the optical transmitter includes at least some of the functional units of the optical node. In the fifth embodiment, differences from the first embodiment to the fourth embodiment will be mainly described.

Figure 9:
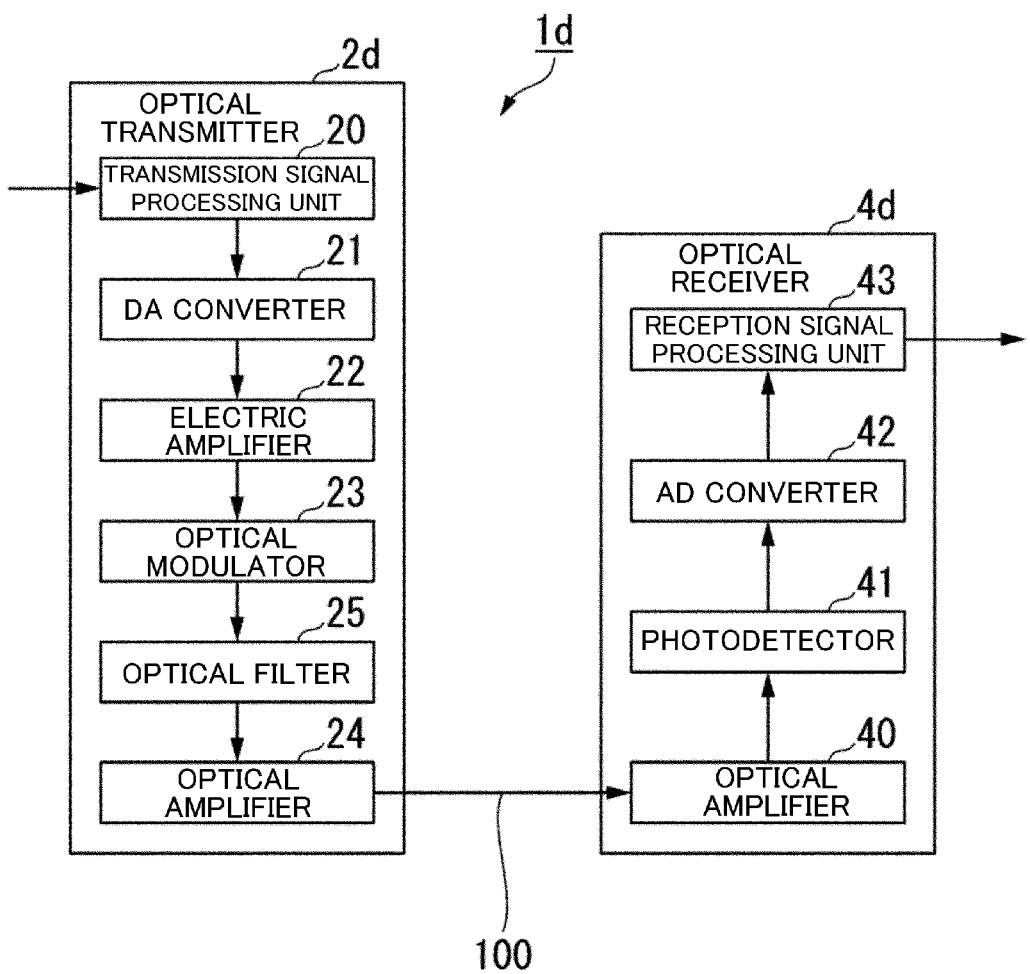
FIG. 9 is a diagram showing an example of a configuration of an optical transmission system in a fifth embodiment.

FIG. 9 is a diagram showing an example of a configuration an optical transmission system 1d in the fifth embodiment. The optical transmission system 1d includes an optical transmitter 2d, a transmission line 100, and an optical receiver 4d. The optical transmitter 2d includes a transmission signal processing unit 20, a DA converter 21, an electric amplifier 22, an optical modulator 23, an optical amplifier 24 and an optical filter 25. In FIG. 9, since the optical transmitter 2d includes the optical filter 25 having a permeation characteristic (non-ripple components having a predetermined reverse characteristic) of compensating for non-ripple components having a predetermined transmission characteristic, the optical transmission system 1d may not include a control device.

The optical modulator 23 generates a wavelength-multiplexed optical signal by performing optical modulation processing on an analog electrical signal. The optical modulator 23 outputs the wavelength-multiplexed optical signal to the optical filter 25. The optical signal output from the optical modulator 23 does not include a large overshoot. Therefore, the peak-to-average power ratio of the waveform of the optical signal output from the optical modulator 23 is low. The optical filter 25 executes processing for compensating for non-ripple components of the transmission characteristic on the wavelength-multiplexed optical signal. The optical filter 25 outputs the optical signal in which the non-ripple components of the transmission characteristic have been compensated for to the optical amplifier 24.

When the transmission characteristic of signals in the optical transmitter 2d is known in advance, the optical transmitter 2d includes the optical filter 25 that compensates for non-ripple components of the transmission characteristic known in advance. That is, the optical transmitter 2d includes the optical filter 25 designed on the basis of predetermined non-ripple components "K(f)." The optical transmitter 2d may include the optical filter 25 designed on the basis of the intensity "$|K(f)|^2$."

Therefore, the setting value of the optical filter 25 may not be set from the outside of the optical filter 25. The optical filter 25 may be integrated using, for example, silicon photonics such that it is integrated with the optical modulator 23.

As described above, the optical transmitter 2d has the optical filter 25 that compensates for the non-ripple components of the transmission characteristic. Accordingly, it is possible to reduce signal waveform deterioration.

Sixth Embodiment

The sixth embodiment differs from the fourth embodiment in that ripple components "J(f)" and non-ripple components "K(f)" are derived on the basis of the reverse characteristic "G(f)" of the transmission characteristic. In the sixth embodiment, differences from the fourth embodiment will be mainly described.

The control device 5c derives the ripple components "J(f)" of the reverse characteristic and the non-ripple components "K(f)" of the reverse characteristic on the basis of the reverse characteristic "G(f)" of the transmission characteristic. The non-ripple components "K(f)" correspond to a result obtained by removing fine structure components (micro-fluctuating components) from the reverse characteristic "G(f)." Therefore, it is possible to derive the non-ripple components "K(f)" according to convolution processing or averaging processing using a window function.

The control device 5c derives the non-ripple components "K(f)" as represented by formula (9).

[Math. 9]
$$K(f) = \int_{-\infty}^{\infty} G(f - f')W(f')df' \tag{9}$$

Here, "W(f)" represents a window function. The area of this window function is 1. As the window function, for example, a moving average or the like is used.

The ripple components "J(f)" of the reverse characteristic corresponds to a result obtained by removing the non-ripple components "K(f)" of the reverse characteristic from the reverse characteristic "G(f)." The control device 5c derives ripple components "J(f)" of the reverse characteristic as represented by formula (10).

[Math. 10]
$$J(f) = \frac{G(f)}{K(f)} \tag{10}$$

As described above, the control device 5c derives the non-ripple components of the reverse characteristic by performing convolution processing or averaging processing on the reverse characteristic of the transmission characteristic, and controls the operation of the optical filter on the basis of the non-ripple components of the reverse characteristic. The control device 5c derives the ripple components of the reverse characteristic by removing the derived non-ripple components of the reverse characteristic from the reverse characteristic, and controls the operation of the digital filter on the basis of the ripple components of the reverse characteristic. Accordingly, it is possible to reduce signal waveform deterioration.

Seventh Embodiment

The seventh embodiment differs from the sixth embodiment with respect to a method of deriving the ripple components "J(f)" and the non-ripple components "K(f)." In the seventh embodiment, differences from the sixth embodiment will be mainly described.

Hereinafter, symbols added above characters in formulas are written immediately before the characters. For example, symbol added above character "s" in formulas is written immediately before character "s" like "→s.".

A setting value depending on the non-ripple components "K(f)" is set in the optical filter of the variable optical filter 31. In the seventh embodiment, a value representing a permeation characteristic that does not include phase information is used as a setting value of the optical filter. For example, when only a setting value corresponding to a loss at each frequency can be set in the variable optical filter 31, a value representing transmittance at each frequency is used as the setting value of the optical filter.

The control device 5c derives the intensity "|K(f)|²" of the non-ripple components "K(f)" as represented by formula (11) instead of deriving the non-ripple components.

[Math. 11]
$$|K(f)|^2 = \int_{-\infty}^{\infty} |G(f - f')|^2 W(f')df' \tag{11}$$

The control device 5c sets a setting value of the optical filter corresponding to the intensity "|K(f)|²" of the non-ripple components in the optical filter of the variable optical filter 31. Accordingly, it is possible to compensate for signal waveform deterioration caused by transmission characteristics of signals in the optical transmitter 2c and the optical receiver 4c.

In this state, the optical transmitter 2c transmits an optical signal of a training signal sequence "→s" generated based on the basis of a random sequence to the optical receiver 4c via the transmission line 100. The optical signal received by the optical receiver 4c is a signal in which non-ripple components of signals in the optical transmitter 2c and the optical receiver 4c have been compensated for by the optical filter of the variable optical filter 31. Therefore, the optical signal received by the optical receiver 4c is a signal which has been affected only by ripple components of the reverse characteristic.

The reception signal processing unit 43 of the optical receiver 4c derives the ripple components "J(f)" as represented formula (12) on the basis of the optical signal received by the optical receiver 4c.

[Math. 12]
$$\vec{h} = R^{-1} \cdot \vec{s} \tag{12}$$

Further, formula (13) is established.

[Math. 13]
$$\vec{h} \triangleq \left( h_{-\frac{M-1}{2}} h_{-\frac{M-1}{2}+1} \ldots h_0 \ldots h_{\frac{M-1}{2}-1} h_{\frac{M-1}{2}} \right)^T \tag{13}$$

Here, "$h_j$" represents the tap coefficient of the digital filter of the transmission signal processing unit 20. "M" represents the number of taps.

Further, formula (14) is established.

[Math. 14]
$$\vec{s} \triangleq (s_n s_{n+1} \ldots s_{n+N-1})^T \tag{14}$$

Here, "$s_n$" represents n-th data in the transmitted training signal sequence "→s." "N" represents the number of pieces of sample data used to derive a tap coefficient "→h" represented in the time domain. "R" represents a matrix composed of the received training signal (received signal). "$R^{-1}$" represents a pseudo-inverse matrix of the matrix "R."

[Math. 15]
$$R \triangleq \begin{pmatrix} r_{n-\frac{M-1}{2}} & r_{n-\frac{M-1}{2}+1} & \cdots & r_n & \cdots & r_{n+\frac{M-1}{2}} \\ r_{n-\frac{M-1}{2}+1} & r_{n-\frac{M-1}{2}+2} & \cdots & r_{n+1} & \cdots & r_{n+\frac{M-1}{2}+1} \\ \vdots & \vdots & \cdots & \vdots & \vdots & \vdots \\ r_{n-\frac{M-1}{2}+N-1} & r_{n-\frac{M-1}{2}+N+1} & \cdots & r_{n+N-1} & \cdots & r_{n+\frac{M-1}{2}+N-1} \end{pmatrix} \tag{15}$$

Here, "$r_n$" represents n-th data in the received training signal sequence (received signal sequence) "r." "→h" represents the tap coefficient represented in the time domain. The reception signal processing unit 43 derives a tap coefficient represented in the frequency domain by executing Fourier transform on the tap coefficient "→h" represented in a time domain. The tap coefficient represented in the frequency domain corresponds to the ripple components "J(f)."

Instead of the reception signal processing unit 43 deriving the tap coefficient, the control device 5c may derive the tap coefficient. In this case, the control device 5c acquires information of the transmitted training signal sequence from the optical transmitter 2c. The control device 5c acquires information of the received training signal sequence from the optical receiver 4c. The control device 5c derives the tap coefficient "→h" represented in the time domain on the basis of the information of the training signal sequence acquired from the optical transmitter 2c and the information of the training signal sequence acquired from the optical receiver 4c.

As described above, the control device 5c or the optical transmitter 2c derives the ripple components of the reverse characteristic by removing the derived non-ripple components of the reverse characteristic from the reverse characteristic, and controls the operation of the digital filter on the basis of the ripple components of the reverse characteristic. Accordingly, it is possible to reduce signal waveform deterioration.

Eighth Embodiment

The eighth embodiment differs from the first to seventh embodiments in that the intensity "|K(f)|²" of the non-ripple components "K(f) of the reverse characteristic "G(f)" is derived when the reverse characteristic "G(f)" of the transmission characteristic is not known. In the eighth embodiment, differences from the first to seventh embodiments will be mainly described.

The transmission signal processing unit 20 performs waveform shaping of a random sequence into a rectangular spectrum using a raised-cosine filter (RCF). The random sequence waveform-shaped into the rectangular spectrum is used as a training signal in the optical receiver 4c.

The reception signal processing unit 43 executes discrete Fourier transform on M consecutive samples in the received training signal. That is, the reception signal processing unit 43 executes discrete Fourier transform on samples from "$r_{n+(p-1)M}$" to "$r_{n+pM-1}$." Accordingly, the reception signal processing unit 43 derives a frequency spectrum "$Q_p(f)$" of the received training signal.

For example, the reception signal processing unit 43 executes discrete Fourier transform on samples from "r" to "$r_{(n+M-1)}$." Accordingly, the reception signal processing unit 43 derives a frequency spectrum "$Q_1(f)$" of the received training signal.

For example, the reception signal processing unit 43 executes discrete Fourier transform on samples from "$r_{(n+m)}$" to "$r_{(n+2M-1)}$." Accordingly, the reception signal processing unit 43 derives a frequency spectrum "$Q_2(f)$" of the received training signal.

The reception signal processing unit 43 derives the intensity (power spectrum) "|Qp(f)|²" of the frequency spectrum "$Q_p(f)$" of the training signal. The reception signal processing unit 43 derives the intensity "|K(f)|²" of the non-ripple components of the reverse characteristic "G(f)" of signals in the optical transmitter 2c and the optical receiver 4c on the basis of the intensity "|Qp(f)|²" of the frequency spectrum.

[Math. 16]

$$|K(f)|^2 = \sum_{p=1}^{P} |Q_p(f)|^2 \qquad (16)$$

Here, "P" represents the number of samples of the frequency spectrum "$Q_p(f)$" used to derive the intensity "|K(f)|²" of the non-ripple components. The intensity "|K(f)|²" of the non-ripple components is composed of M pieces of data. Each sample of the frequency spectrum "$Q_p(f)$" corresponds to the amount of loss at each frequency. Each sample of the frequency spectrum "$Q_p(f)$" is set in the variable optical filter 31 as a setting value of the optical filter.

Reducing the number "M" of pieces of data constituting the intensity "|K(f)|²" of the non-ripple components corresponds to deriving the non-ripple components by stronger smoothing processing. Accordingly, the reception signal processing unit 43 may reduce the number "M" of pieces of data in accordance with a decrease in the resolution of the variable optical filter 31.

Instead of the reception signal processing unit 43 deriving the intensity of the non-ripple components, the control device 5c may derive the intensity of the non-ripple components. The control device 5c derives the intensity "|K(f)|²" of the non-ripple components on the basis of information of the training signal sequence acquired from the optical receiver 4c. When the control device 5c derives the intensity "|K(f)|²" of the non-ripple components, the control device 5c need not acquire the information of the training signal sequence transmitted from the optical transmitter 2c.

As described above, the control device 5c or the optical transmitter 2c derives the ripple components of the reverse characteristic by removing the derived non-ripple components of the reverse characteristic from the reverse characteristic, and controls the operation of the digital filter on the basis of the ripple components of the reverse characteristic. Accordingly, it is possible to reduce signal waveform deterioration.

Ninth Embodiment

The ninth embodiment differs from the first to eighth embodiments in that optical nodes include a wavelength selection switch (WSS) for executing at least one of wavelength multiplexing and wavelength separation. In the ninth embodiment, differences from the first to eighth embodiments will be mainly described.

Figure 10:
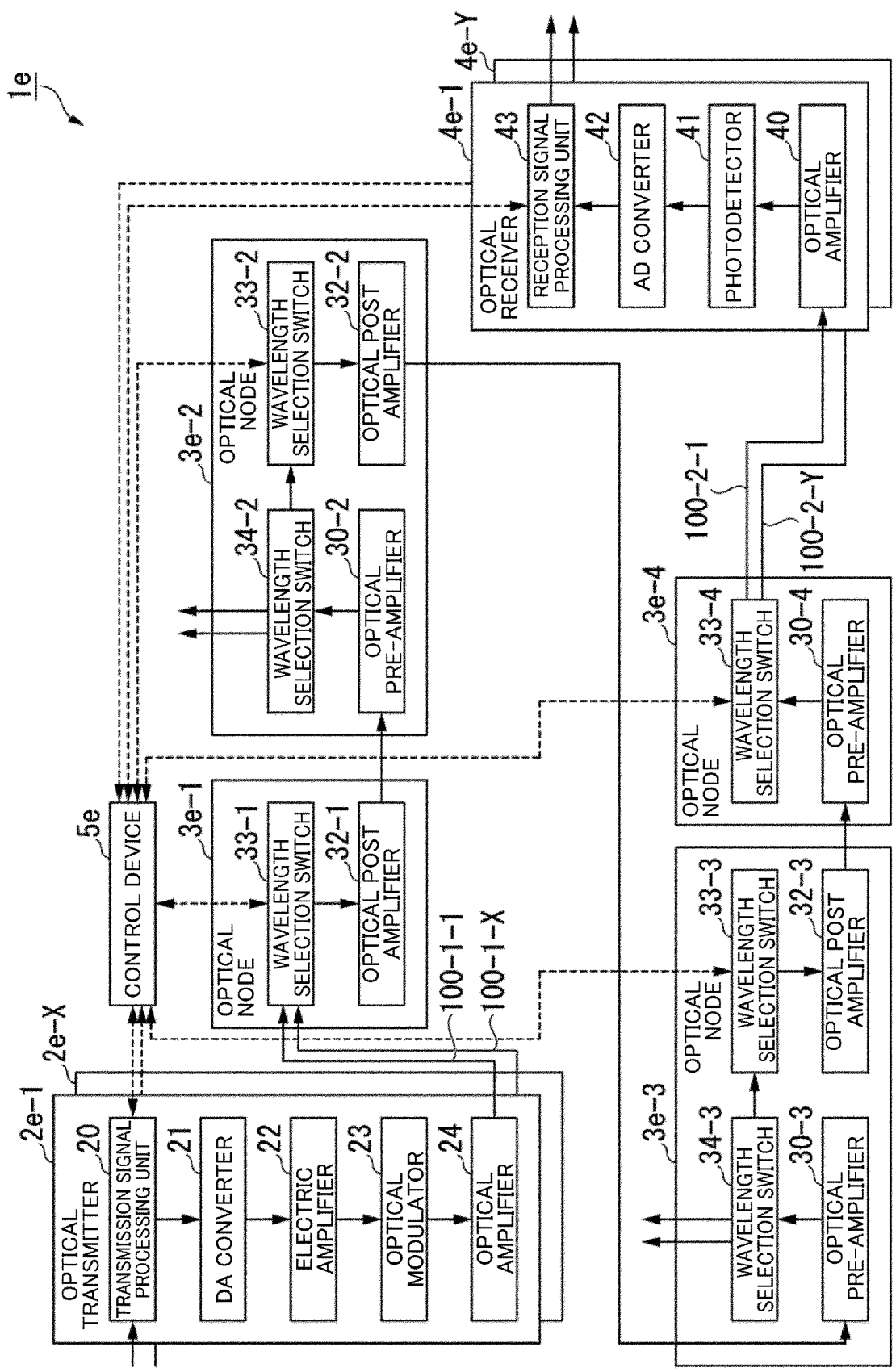
FIG. 10 is a diagram showing an example of a configuration of an optical transmission system in a ninth embodiment.

FIG. 10 is a diagram showing an example of a configuration of an optical transmission system 1e according to the ninth embodiment. The optical transmission system 1e includes an optical transmitter 2e for each wavelength channel. The optical transmitter 2e for each wavelength channel includes, for example, an optical transmitter 2e-1 to an optical transmitter 2e-X.

The optical transmission system 1e further includes a transmission line 100, a plurality of optical nodes 3e, a plurality of optical receivers 4e, and a control device 5e. The plurality of optical nodes 3e include, for example, an optical node 3e-1, an optical node 3e-2, an optical node 3e-3, and an optical node 3e-4.

The optical transmission system 1e includes the plurality of optical receivers 4e for each wavelength channel. The optical receivers 4e for each wavelength channel include, for example, an optical receiver 4e-1 to an optical receiver 4e-Y.

The optical transmitter 2e includes a transmission signal processing unit 20, a DA converter 21, an electric amplifier 22, an optical modulator 23, and an optical amplifier 24.

The optical nodes 3e include a wavelength selection switch (WSS) for wavelength multiplexing or wavelength separation. The optical nodes 3e may further include at least one of an optical preamplifier 30 and an optical post amplifier 32.

The optical node 3e-1 includes an optical post amplifier 32-1 and a wavelength selection switch 33-1. The wavelength selection switch 33 is a wavelength selection switch for wavelength multiplexing. Since the optical node 3e-1 is an optical node for wavelength-multiplexing an optical signal transmitted from the optical transmitter 2e, the optical node 3e-1 may not include a wavelength selection switch for wavelength separation.

The wavelength selection switch 33 includes a variable optical filter. A wavelength selection switch 33 wavelength-multiplexes optical signals transmitted from the respective optical transmitters 2e from the optical transmitters 2e-1 to the optical transmitter 2e-X using a variable optical filter. The wavelength selection switch 33 outputs the wavelength-multiplexed optical signals to a desired path using a variable optical filter according to control of the control device 5e. In the optical node 3e-1, the wavelength selection switch 33-1 outputs a wavelength-multiplexed optical signal to the optical post-amplifier 32-1.

The optical node 3e-2 includes an optical pre-amplifier 30-2, an optical post amplifier 32-2, a wavelength selection switch 33-2, and a wavelength selection switch 34-2. The wavelength selection switch 34 is a wavelength selection switch for wavelength separation. The wavelength selection switch 34 includes a variable optical filter. The wavelength selection switch 34 separates the wavelength of a wavelength-multiplexed optical signal using a variable optical filter. The wavelength selection switch 34 outputs the wavelength-separated optical signal to a desired path using a variable optical filter according to control of the control device 5e.

In the optical node 3e-2, the wavelength selection switch 34-2 outputs a wavelength-multiplexed optical signal to the wavelength selection switch 33-2. The wavelength selection switch 33-2 outputs the wavelength-multiplexed optical signal to the optical post amplifier 32-2.

The optical node 3e-3 includes an optical pre-amplifier 30-3, an optical post amplifier 32-3, a wavelength selection switch 33-3, and a wavelength selection switch 34-3. In the optical node 3e-3, the wavelength selection switch 34-3 outputs a wavelength-multiplexed optical signal to the wavelength selection switch 33-3. The wavelength selection switch 33-3 outputs the wavelength-multiplexed optical signal to the optical post amplifier 32-3.

The optical node 3e-4 includes an optical post amplifier 32-4 and a wavelength selection switch 33-4. Since the optical node 3e-4 is an optical node for transmitting a wavelength-separated optical signal to the optical receiver 4e, the optical node 3e-4 need not include a wavelength selection switch for wavelength multiplexing. In the optical node 3e-3, the wavelength selection switch 33-4 transmits the wavelength-separated optical signal to the respective optical receivers 4e from the optical receiver 4e-1 to the optical receiver 4e-Y via a transmission line 100-2.

Accordingly, the non-ripple components of the transmission characteristics of signals in the optical transmitter 2e and the optical receiver 4e are compensated for using the variable optical filter of the wavelength selection switch.

As described above, the optical nodes 3e include the wavelength selection switch. The wavelength selection switch compensates for at least some of the non-ripple components of the transmission characteristic by performing wavelength multiplexing or wavelength separation on optical signals.

Accordingly, it is possible to reduce signal waveform deterioration. The optical transmission system 1e can compensate for the non-ripple components without providing a variable optical filter different from the wavelength selection switch in the optical transmission system 1e. Therefore, it is possible to curb an increase in the number and cost of the functional units provided in the optical node 3.

Figure 11:
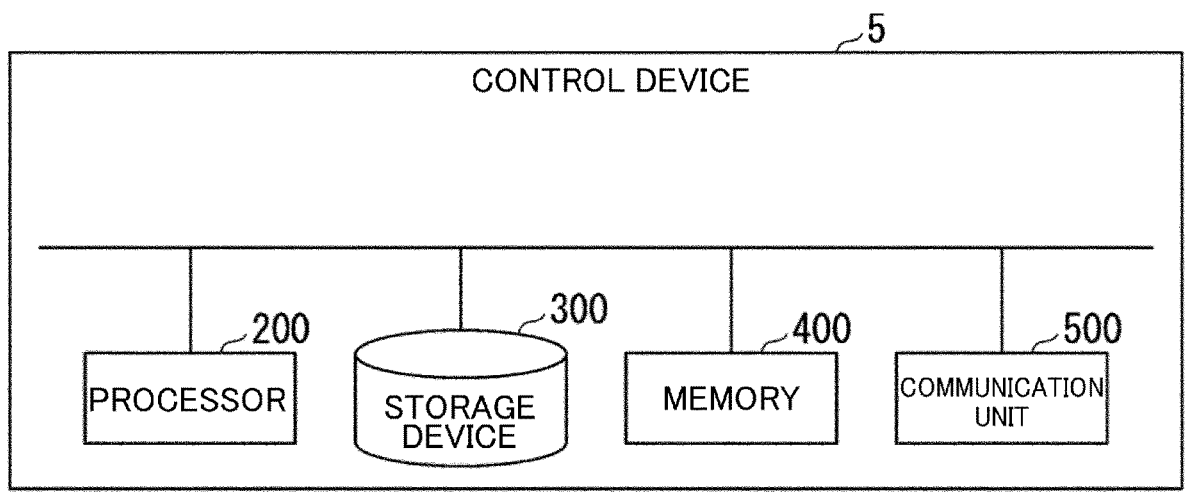
FIG. 11 is a diagram showing an example of a hardware configuration of a control device.

FIG. 11 is a diagram showing an example of a hardware configuration of the control device 5. Some of all of functional units of the control device 5 are realized as software by a processor 200, such as a central processing unit (CPU), executing a program stored in a storage device 300 and a memory 400 including a non-volatile recording medium (non-transitory recording medium). The program may be recorded on a computer-readable recording medium. The computer-readable recording medium is a non-transitory recording medium, for example, a portable medium such as a flexible disk, an optical magnetic disk, a read only memory (ROM) or a compact disc read only memory (CD-ROM), or a storage device such as a hard disk built in computer system. A communication unit 500 executes communication processing.

Some or all of functional units of the control device 5 may be realized using hardware including an electronic circuit (or circuitry) using large scale integration (LSI) circuit, an application specific integrated circuit (ASIC), a programmable logic device (PLD), a field programmable gate array (FPGA), or the like.

Similarly, each functional unit of the optical transmitter and the optical receiver in the optical transmission system may be realized as software by a processor executing a program. Further, each functional unit of the control device of the optical transmission system may be realized using hardware including an electronic circuit or the like.

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention is applicable to optical transmission systems.

REFERENCE SIGNS LIST 1a, 1b, 1c Optical transmission system
2a, 2b, 2c, 2d, 2e Optical transmitter
3a, 3b, 3c, 3e Optical node
4a, 4b, 4c, 4d, 4e Optical receiver
5, 5a, 5b, 5c, 5e Control device
20 Transmission signal processing unit
21 DA converter
22 Electric amplifier
23 Optical modulator
24 Optical amplifier
25 Optical filter
30 Optical pre-amplifier
31 Variable optical filter 32 Optical post amplifier
33 Wavelength selection switch
40 Optical amplifier
41 Photodetector
42 AD converter
43 Reception signal processing unit
100 Transmission line
200 Processor
300 Storage device
400 Memory
500 Communication unit

The invention claimed is:

1. An optical transmission system for transmitting a signal from an optical transmitter to an optical receiver via at least a transmission line among one or more optical nodes and the transmission line, the optical transmission system comprising:
a digital filter included in the optical transmitter that compensates for, between ripple components that are micro-fluctuating components in a frequency region representing a transmission characteristic of the signal in the optical transmitter and the optical receiver and non-ripple components of the transmission characteristic, at least the ripple components of the transmission characteristic,
at least one of the optical node and the optical transmitter includes an optical filter that compensates for the non-ripple components of the transmission characteristic,
a processor; and
a storage medium having computer program instructions stored thereon, when executed by the processor, perform to control operation of the optical node and an operation of the optical transmitter, wherein the plurality of optical nodes compensate for the non-ripple components of the transmission characteristic in a sharing manner on the basis of a sharing rate of an amount of compensation of the non-ripple components of the transmission characteristic derived by the processor.

2. The optical transmission system according to claim 1, wherein the computer program instructions further perform to derive the sharing rate for each of the optical nodes on the basis of power of the signal output from each optical filter.

3. The optical transmission system according to claim 2, wherein the computer program instructions further perform to derive the sharing rate such that an optical signal-to-noise ratio at the time of reception in the optical receiver is maximized.

4. The optical transmission system according to claim 1, wherein the computer program instructions further perform to derive non-ripple components of a reverse characteristic of the transmission characteristic by performing convolution processing or averaging processing on the reverse characteristic and controls an operation of the optical filter on the basis of the non-ripple components of the reverse characteristic, and derives ripple components of the reverse characteristic by removing the derived non-ripple components of the reverse characteristic from the reverse characteristic, and controls an operation of the digital filter on the basis of the ripple components of the reverse characteristic.

5. The optical transmission system according to claim 1, wherein the optical transmitter transmits a training signal to the optical receiver via the transmission line, and the computer program instructions further perform to derive a shape of the digital filter on the basis of the training signal received by the optical receiver.

6. The optical transmission system according to claim 1, wherein the optical nodes further include a wavelength selection switch, and the wavelength selection switch compensates for at least some of the non-ripple components of the transmission characteristic by executing wavelength multiplexing or wavelength separation on the signal.

7. A non-transitory computer-readable storage medium storing a program for causing a computer to serve as the optical transmission system according to claim 1.

8. A control device of an optical transmission system for transmitting a signal from an optical transmitter to an optical receiver via at least a transmission line among one or more optical nodes and the transmission line, the control device comprising:
a processor; and
a storage medium having computer program instructions stored thereon, when executed by the processor, perform:
convolution processing or averaging processing on a reverse characteristic of a transmission characteristic of the signal in the optical transmitter and the optical receiver to derive non-ripple components of the reverse characteristic, controlling an operation of an optical filter that compensates for non-ripple components of the transmission characteristic on the basis of the non-ripple components of the reverse characteristic,
deriving ripple components of the reverse characteristic by removing the derived non-ripple components of the reverse characteristic from the reverse characteristic, and controlling an operation of a digital filter that compensates for the ripple components of the transmission characteristic on the basis of the ripple components of the reverse characteristic.

9. An optical transmission method executed by an optical transmission system for transmitting a signal from an optical transmitter to an optical receiver via at least a transmission line among one or more optical nodes and the transmission line, the method comprising:
compensating for, by the optical transmitter, between ripple components that are micro-fluctuating components in a frequency region representing a transmission characteristic of the signal in the optical transmitter and the optical receiver and non-ripple components of the transmission characteristic, at least the ripple components of the transmission characteristic, using a digital filter;
compensating for, by at least one of the optical node and the optical transmitter, the non-ripple components of the transmission characteristic using an optical filter; and
controlling an operation of the optical node and an operation of the optical transmitter, wherein the plurality of optical nodes compensate for the non-ripple components of the transmission characteristic in a sharing manner on the basis of a sharing rate of an amount of compensation of the non-ripple components of the transmission characteristic.

* * * * *